(12) United States Patent
Chuang et al.

(10) Patent No.: US 7,649,694 B2
(45) Date of Patent: Jan. 19, 2010

(54) ZOOM LENS

(75) Inventors: Fu-Ming Chuang, Hsinchu (TW);
Kuo-Chuan Wang, Hsinchu (TW)

(73) Assignee: Young Optics Inc., Hsinchu (TW)

( * ) Notice: Subject to any disclaimer, the term of this patent is extended or adjusted under 35 U.S.C. 154(b) by 414 days.

(21) Appl. No.: 11/610,507

(22) Filed: Dec. 14, 2006

(65) Prior Publication Data
US 2007/0223104 A1 Sep. 27, 2007

(30) Foreign Application Priority Data
Mar. 21, 2006 (TW) .............................. 95109611 A

(51) Int. Cl.
*G02B 15/14* (2006.01)
(52) U.S. Cl. ...................... 359/686; 359/682
(58) Field of Classification Search ......... 359/680–682, 359/686
See application file for complete search history.

(56) References Cited
U.S. PATENT DOCUMENTS
5,173,806 A * 12/1992 Ogata ......................... 359/683

5,748,384 A * 5/1998 Sensui ........................ 359/686
5,786,942 A * 7/1998 Komori et al. ............... 359/686
5,999,329 A 12/1999 Ohtake
2004/0189834 A1 9/2004 Hagimori et al.

FOREIGN PATENT DOCUMENTS
KR 1998-068668 10/1998
TW 299039 2/1997

* cited by examiner

*Primary Examiner*—Scott J Sugarman
(74) *Attorney, Agent, or Firm*—Jianq Chyun IP Office

(57) ABSTRACT

A zoom lens suitable for imaging an object on a photosensitive device is provided. The zoom lens includes a first lens group, a second lens group, a third lens group and a fourth lens group, which are arranged in series. The fourth lens group is disposed near the photosensitive device. The second lens group and the third lens group are suitable for moving between the first lens group and the fourth lens group. The first lens group, the second lens group, the third lens group and the fourth lens group include at least a glass lens and a plurality of plastic lenses. The number of the plastic lenses is more than the number of glass lenses. Thus, overall cost of producing the zoom lens is lower.

9 Claims, 8 Drawing Sheets

ZOOM LENS

CROSS-REFERENCE TO RELATED APPLICATION

This application claims the priority benefit of Taiwan application serial no. 95109611, filed on Mar. 21, 2006. All disclosure of the Taiwan application is incorporated herein by reference.

BACKGROUND OF THE INVENTION

1. Field of the Invention

The present invention relates to a zoom lens, and more particularly, to a low cost zoom lens.

2. Description of Related Art

With the rapid development of video technologies, imaging devices such as digital video cameras (DVC) and digital cameras (DC) have found widespread applications. The core element of these imaging devices is a zoom lens. By varying the optical focus of the zoom lens, a clean image can be focused on a charge-coupled device (CCD). The optical quality of the zoom lens is closely related to the imaging quality, manufacturers are now trying to improve the quality of the zoom lens while lowering the production cost in order to provide a competitive edge of their imaging device in the market.

FIG. 1A is a diagram showing the structure of a conventional zoom lens. The conventional zoom lens 100a in FIG. 1A has been disclosed in the U.S. Patent application 2004/0189834 A1. The zoom lens 110a includes four lens groups 110a, 120a, 130a and 140a. The lens group 110a comprises a single lens 112a; the lens group 120a comprises two lenses 122a; the lens group 130a comprises a single lens 132a; and, the lens group 140a comprises two lenses 142a.

The conventional zoom lens 100a uses the relative motion between the lens group 110a, the lens group 120a and the lens group 130a to increase the magnification or decrease the magnification. Thus, the zoom lens 110a must have a linkage designed to move the lens groups 110a, 120a and 130a simultaneously. This mechanical linkage not only increases the complexity of the zoom lens, but also increases the production cost and the bulk of the zoom lens.

Furthermore, because a total of 6 lenses are required in the zoom lens 100a, sufficient space must be allowed for accommodating the relative movement between the lens groups 110a, 120a and 130a. As a result, the overall length of the zoom lens 100a is often too large. Aside from the difficulty of miniaturizing the zoom lens, it is also difficult to lower the production cost.

FIG. 1B is a diagram showing the structure of another conventional zoom lens. The conventional zoom lens 100b in FIG. 1B has been disclosed in the Taiwan Patent No. 299039. The zoom lens 100b includes four lens groups 110b, 120b, 130b and 140b whose refractive powers are negative, positive, negative and negative respectively. The lens group 110b comprises three lenses 112b; the lens group 120b comprises three lenses 122b; the lens group 130b comprises three lenses 132b; and the lens group 140b comprises a single lens 142b.

The zoom lens 100b requires a series of 10 lenses, overall length of the zoom lens is often too large. Thus, not only is miniaturizing the zoom lens difficult, but lowering the production cost of the zoom lens is also difficult as well.

SUMMARY OF THE INVENTION

Accordingly, at least one objective of the present invention is to provide a high resolution and low cost zoom lens.

To achieve these and other advantages and in accordance with the purpose of the invention, as embodied and broadly described herein, the invention provides a zoom lens suitable for imaging an object on a photosensitive device. The zoom lens includes a first lens group, a second lens group, a third lens group and a fourth lens group, which are arranged in series. The fourth lens group is disposed near the photosensitive device. The second lens group and the third lens group are suitable for moving between the first lens group and the fourth lens group. The first lens group, the second lens group, the third lens group and the fourth lens group include at least a glass lens and a plurality of plastic lenses. The number of the plastic lenses is more than the number of glass lenses.

In brief, the conventional zoom lens uses a total of 6 lenses while the zoom lens in the present invention only uses five lenses. Therefore, the material cost for the lens is saved in the present invention. Moreover, the zoom lens is assembled using plastic lenses that are produced en-mass at a relatively low cost. Thus, the production yield of the zoom lens is increased and the production cost of the zoom lens is lowered.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE PREFERRED EMBODIMENTS

Figure 1A:
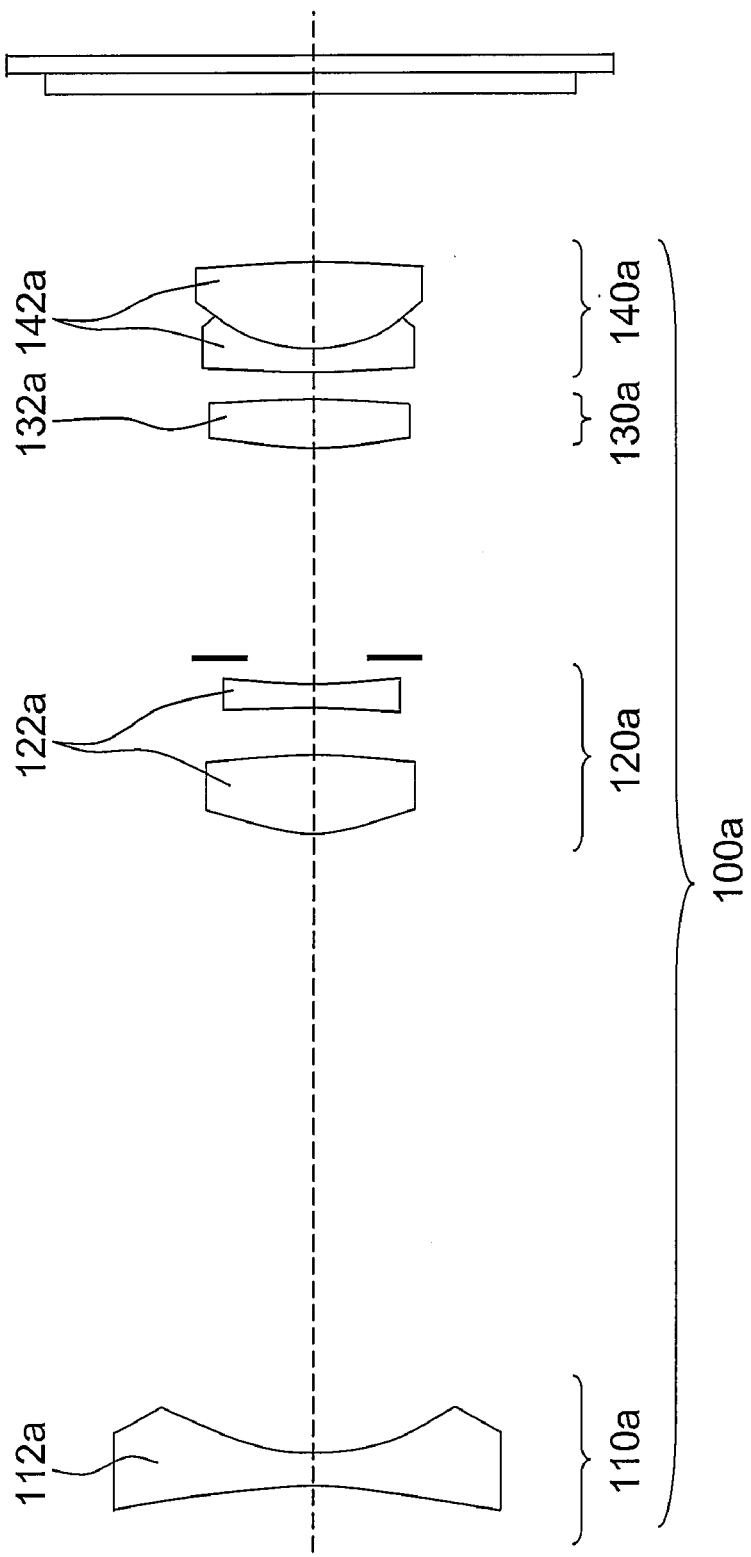
FIG. 1A is a diagram showing a structure of a conventional zoom lens.

Reference will now be made in detail to the present preferred embodiments of the invention, examples of which are illustrated in the accompanying drawings. Wherever possible, the same reference numbers are used in the drawings and the description to refer to the same or like parts.

Figure 2A:
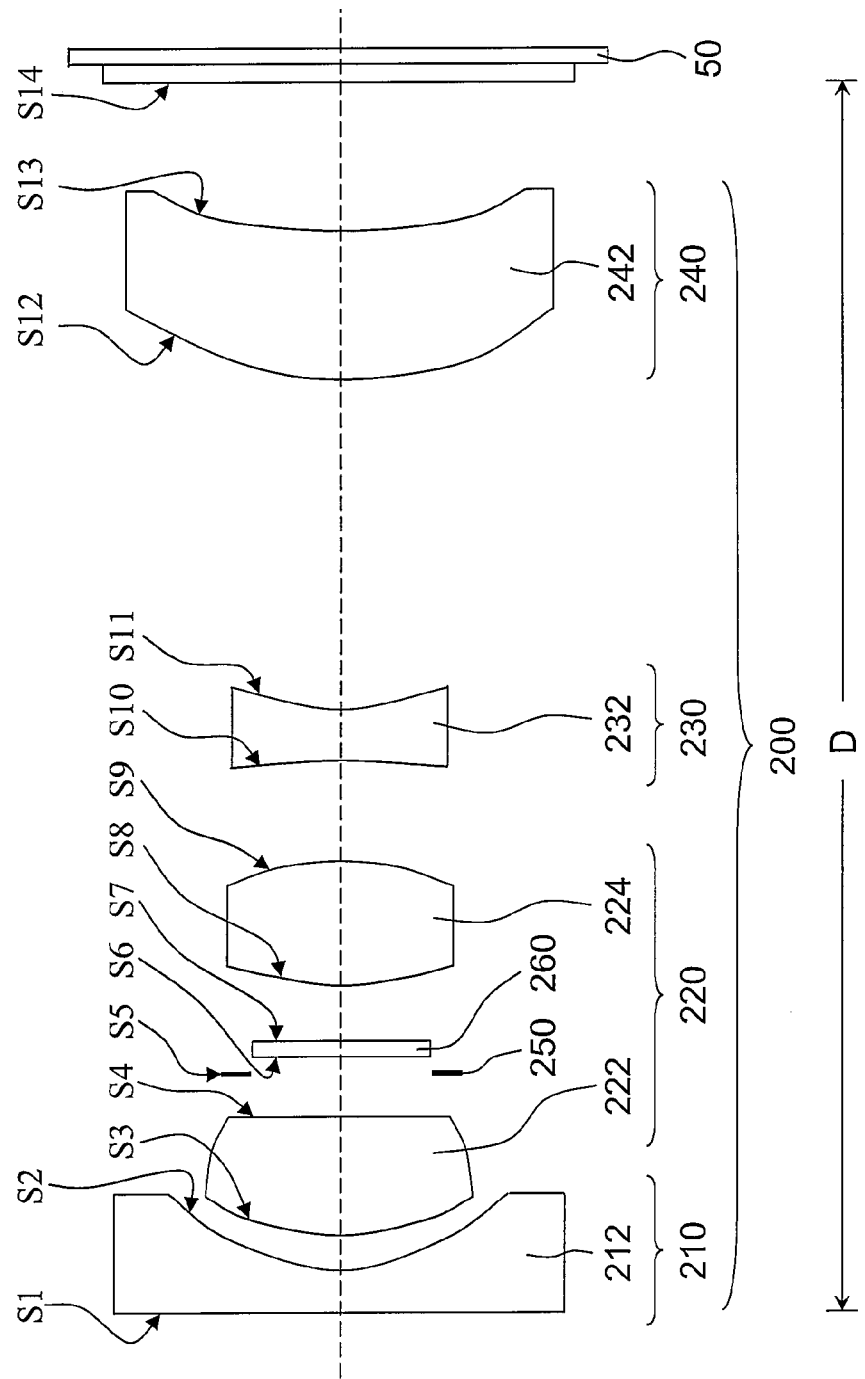
FIG. 2A through 2C are diagrams showing the structures of a zoom lens under various focusing magnifications according to one embodiment of the present invention.
Figure 2B:
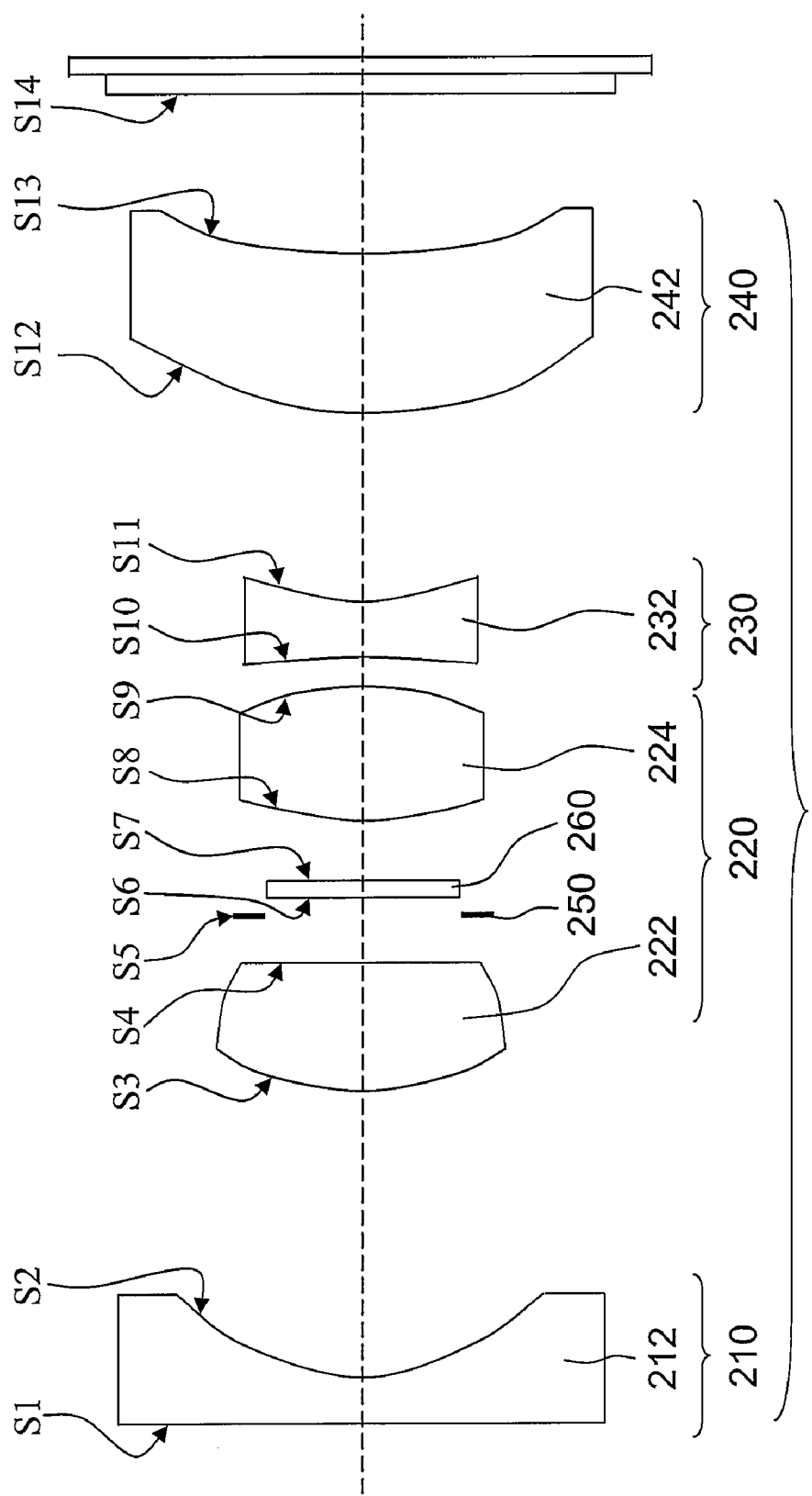
Figure 2C:
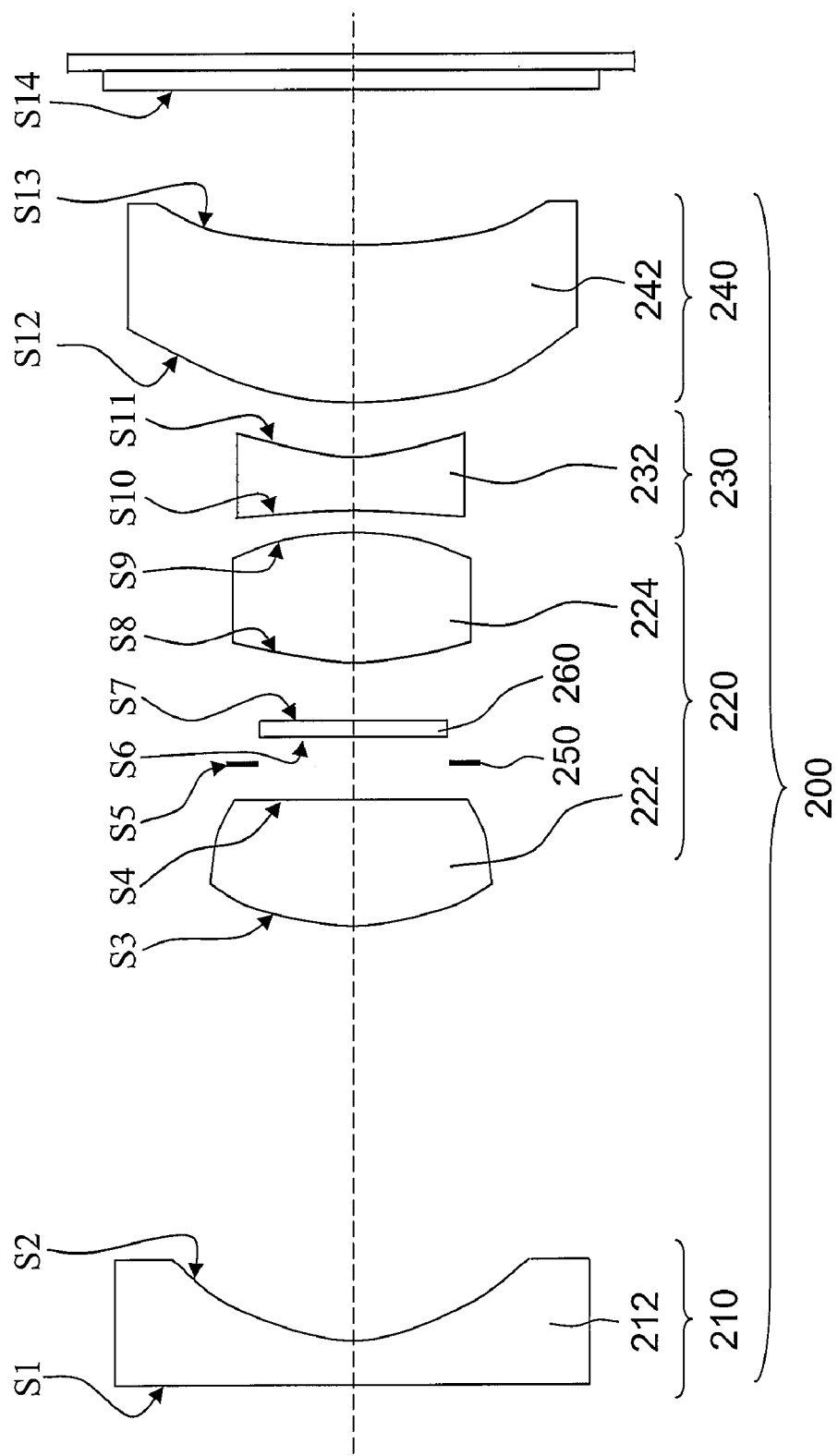

FIG. 2A through 2C are diagrams showing the structures of a zoom lens under various focusing magnifications according to one embodiment of the present invention. FIG. 2A is a diagram showing the allocations of various lens groups when the zoom lens is set to a tele-end configuration. FIG. 2B is a diagram showing the locations of various lens groups when the zoom lens is set to a middle configuration. FIG. 2C is a diagram showing the allocations of various lens groups when the zoom lens is set to a wide-end configuration. As shown in FIGS. 2A through 2C, the zoom lens 200 in the present invention is suitable for imaging an object (not shown) on a photosensitive device 50. The photosensitive device 50 is, for example, a charge-coupled device (CCD) or a complementary metal-oxide semiconductor (CMOS) device. The zoom lens 200 includes a first lens group 210, a second lens group 220, a third lens group 230 and a fourth lens group 240, which are arranged in series. The fourth lens group 240 is disposed near the photosensitive device 50. The second lens group 220 and the third lens group 230 are suitable for moving between the first lens group 210 and the fourth lens group 240. The first lens group 210, the second lens group 220, the third lens group 230 and the fourth lens group 240 include at least a glass lens and a plurality of plastic lenses. The number of the plastic lenses is more than the number of glass lenses.

The zoom lens 200 in the present embodiment uses five lenses. Furthermore, the refractive powers of the first lens group 210, the second lens group 220, the third lens group 230 and the fourth lens group 240 are negative, positive, negative and positive respectively so that an effective means of eliminating image distortion and chromatic aberration can be achieved. Furthermore, the aspheric technique can be used to provide miniaturization and achieve a higher resolution. Moreover, plastic lenses are easier to produce and have a lower cost of production and, hence, provide a competitive advantage over glass lenses. Therefore, by using a large number of plastic lenses inside the zoom lens 200, the present invention is able to increase production yield and lower production cost while maintaining good optical properties.

For the zoom lens 200 shown in FIGS. 2A through 2C, the first lens group 210 includes a first plastic lens 212 having a negative refractive power. The second lens group 220 includes a second plastic lens 222 and a third plastic lens 224. The third plastic lens 224 is located between the second plastic lens 222 and the third lens group 230. The second plastic lens 222 has a positive refractive power and the third plastic lens 224 also has a positive refractive power. The third lens group 230 includes a glass lens 232 having a negative refractive power. The fourth lens group 240 includes a fourth plastic lens 242 having a positive refractive power.

Figure 1B:
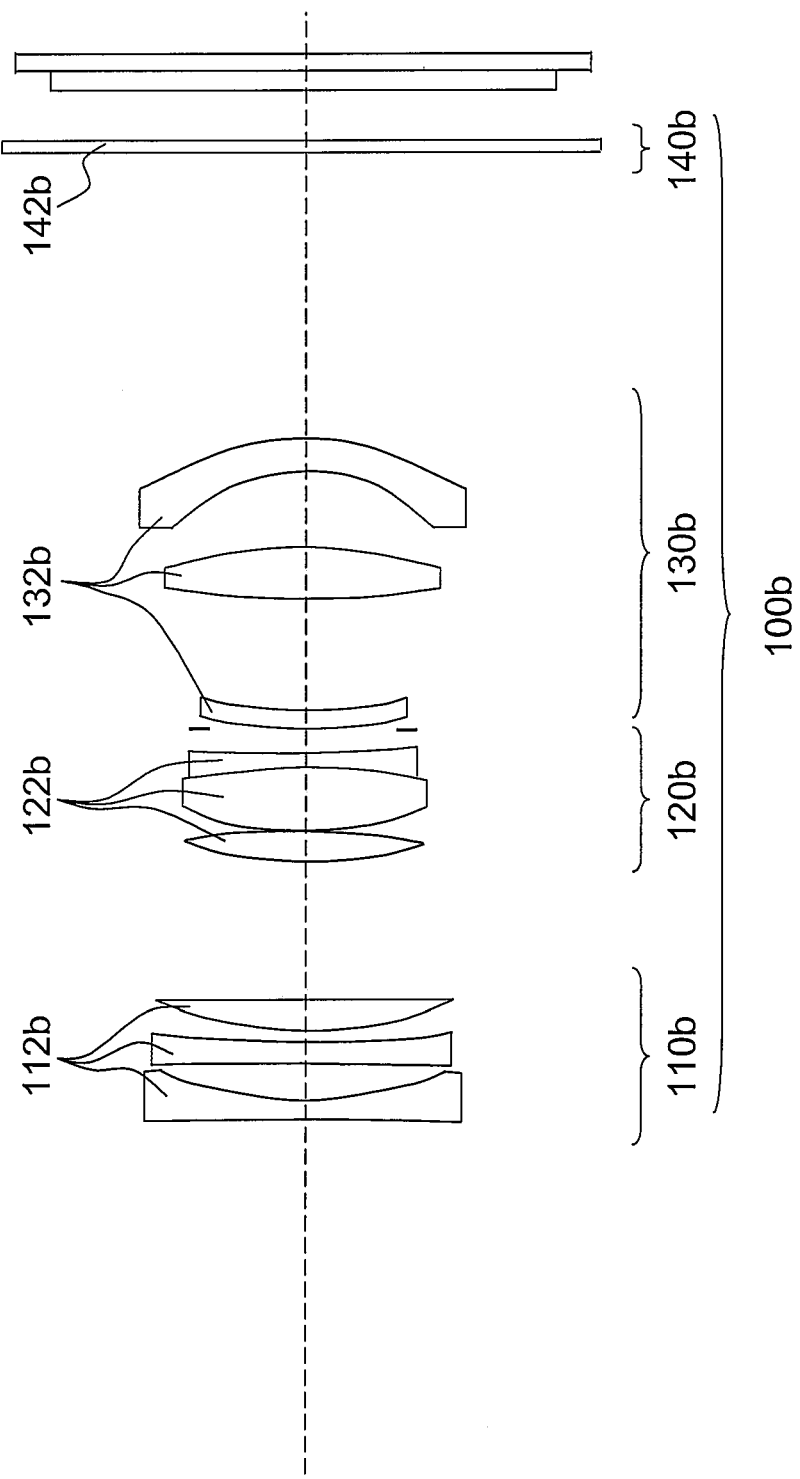
FIG. 1B is a diagram showing a structure of another conventional zoom lens.

The zoom lens 200 further includes an aperture stop 250 disposed between the second plastic lens 222 and the third plastic lens 224. The fourth plastic lens 242 is a meniscus lens. The convex side of the fourth plastic lens 242 faces the third lens group 230. Thus, compared to the 6-lenses conventional zoom lens 100a (as shown in FIG. 1A) or the 10-lenses conventional zoom lens 100b (as shown in FIG. 1B), only five lenses are used in the zoom lens 200 in the present embodiment. Furthermore, only one of the lenses is a more expensive glass lens. Therefore, the zoom lens 200 in the present invention has a lower production cost.

In the present embodiment, when the magnification of the zoom lens 200 changes from the tele-end configuration (as shown in FIG. 2A) to the middle configuration (as shown in FIG. 2B) or changes from the middle configuration to the wide-end configuration (as shown in FIG. 2C), such that the magnification is decreasing, the second lens group 220 and the third lens group 230 are moving towards the fourth lens group 240. Conversely, when the magnification of the zoom lens 200 changes from the middle configuration to the tele-end configuration or changes from the wide-end configuration to the middle configuration, such that the magnification is increasing, the second lens group 220 and the third lens group 230 move away from the fourth lens group 240. In other words, only the second lens group 220 and the third lens group 230 need to be moved when the zoom lens 200 is zoomed in or zoomed out so that the linkage mechanism of the zoom lens is particularly simple to design. As a result, not only is the cost for designing and producing the linkage mechanism reduced, but can also minimize the chance of failure when the linkage mechanism is complicated. Since the zoom lens 200 in the present embodiment only requires 5 lenses and has a particularly simple linkage mechanism, the size of the zoom lens 200 is further reduced to match the miniaturization trend.

In addition, when the distance to an imaging object changes, the imaging location of the object is adjusted by moving the third lens group 230 away from or toward the photosensitive device 50 so that a clear image is formed inside the zoom lens 200. In other words, beside a focusing function, the third lens group 230 also provides image compensation function for preventing problems such as image aberration and shifting of the imaging surface. Furthermore, the third lens group 230 only has a single lens so that a smaller stepping motor can be selected as a driving motor for adjusting the focus. As a result, the size of the zoom lens 200 is further reduced. It should be noted that in order to improve the imaging quality of the zoom lens 200 even further, when the magnification of the zoom lens 200 is switched to the wide-end configuration, $4<\theta/D<5$, where $\theta$ is the field of view (FOV) angle as the zoom lens 200 is in the wide-end configuration, and D is the distance between the first plastic lens 212 of the first lens group 210 and the photosensitive device 50. More specifically, the distance D refers to the distance between the surface of the first plastic lens 212 away from the photosensitive device 50 and the active surface of the photosensitive device 50. In addition, under the various possible magnifications of the foregoing zoom lens, the difference in an angle of the chief ray of the imaging beam of an object incident upon the photosensitive device 50 is smaller than 15°.

To provide even a better optical properties, the foregoing zoom lens 200 further includes an infrared cutting plate 260 disposed between the aperture stop 250 and the third plastic lens 224. In the following, one preferred embodiment of the zoom lens 200 is described. However, the numerical data listed in Table 1 and Table 2 in the following should not be used to limit the present invention. Since anyone familiar with the technique may arrive at a new solution by modifying the parameters or settings after referring to the present invention, these modifications should still be regarded to be within the scope of the present invention.

TABLE 1

| Surface | Radius of Curvature (mm) | Distance (mm) | Refractive Index | Abbe Number | Remarks |
| --- | --- | --- | --- | --- | --- |
| S1 | −31.80050 | 0.600000 | 1.5247 | 56.26 | First plastic lens |
| S2 | 2.75276 | 5.58479 | | | |
| S3 | 3.63049 | 1.569078 | 1.5247 | 56.26 | Second plastic lens |
| S4 | 37.32648 | 0.9335901 | | | |
| S5 | Infinite | 0.300000 | | | Aperture Stop |
| S6 | Infinite | 0.665014 | | | Infrared Cutting Plate |
| S7 | Infinite | 0.000000 | | | |
| S8 | 3.82415 | 1.691177 | 1.5247 | 56.26 | Third plastic lens |
| S9 | −3.92607 | 0.30000 | | | |
| S10 | 41.74841 | 0.750000 | 1.9164 | 22.40 | Glass lens |
| S11 | 2.87437 | 0.60000 | | | |
| S12 | 5.75374 | 2.119573 | 1.5855 | 29.92 | Fourth plastic Lens |
| S13 | 10.62708 | 2.085000 | | | |
| S14 | Infinite | 0.000000 | | | Photosensitive Device |

In Table 1, S1, S2, S3, S4, S8, S9, S10, S11, S12, S13 can be represented by the following formula:

$$X = \frac{(1/R)H^2}{1+\sqrt{1-(1+K)(H/R)^2}} + AH^4 + BH^6 + CH^8 + DH^{10},$$

wherein X is the amount of shift in the optical axis. R is the radius of the osculating sphere, such that the radius of curvature is close to the optical axis (such as the radius of curvature of S1, S2, S3, S4, S8, S9, S10, S11, S12 and S13 in Table 1). H is the aspheric height, such as the height from the center of the lens to the edge of the lens. According to the formula, different values of the height correspond to different values of X. In the present design, K=0, and A, B, C, D are aspheric coefficients. The aspheric coefficients of S1~S4 and S8~S13 are listed in the following table.

| Surface | A | B | C | D |
|---|---|---|---|---|
| S1 | 0.206039E−02 | −0.21955E−03 | 0.713113E−05 | 0.542020E−07 |
| S2 | −0.662289E−03 | −0.243290E−03 | −0.457034E−04 | −0.718558E−05 |
| S3 | 0.219279E−03 | 0.455407E−03 | −0.278355E−05 | 0.233073E−04 |
| S4 | 0.238375E−02 | 0.967666E−03 | 0.553975E−04 | 0.609630E−04 |
| S8 | −0.702528E−02 | −0.115498E−02 | 0.105470E−03 | −0.104444E−03 |
| S9 | −0.440728E−02 | −0.488559E−03 | 0.121629E−03 | 0.755719E−04 |
| S10 | −0.162667E−01 | 0.302641E−03 | 0.338125E−03 | −0.847203E−04 |
| S11 | −0.102933E−01 | 0.108199E−03 | 0.147990E−03 | −0.690222E−04 |
| S12 | 0.391035E−02 | 0.224161E−04 | 0.428108E−05 | 0.652829E−06 |
| S13 | 0.34909E−02 | 0.100930E−02 | −0.170014E−03 | 0.215510E−04 |

Also in Table 1 the radius of curvature (mm) represents the radius of curvature of each surface and the distance (mm) represents the distance between two adjoin surfaces. For example, the distance of the surface S1 represents the distance between the surface S1 and the surface S2. The value of the thickness, the refractive index and the Abbe number of various lenses and infrared stop plate in the remark column are found on a corresponding row. Furthermore, in Table 1, the surfaces S1 and S2 of the first plastic lens 212 are the surface away from the second plastic lens 222 and the surface adjacent to the second plastic lens 222 respectively. The surfaces S3 and S4 of the second plastic lens 222 are the surface adjacent to the first plastic lens 212 and the surface adjacent to the third plastic lens 224 respectively. The surface S5 is the aperture stop for controlling the amount of incident light. The surfaces S6 and S7 of the infrared stop plate 260 are the surface adjacent to the second plastic lens 222 and the surface adjacent to the third plastic lens 224 respectively. The surfaces S8 and S9 of third plastic lens 224 are the surface adjacent to the second plastic lens 222 and the surface adjacent to the glass lens 232 respectively. The surfaces S10 and S11 of the glass lens 232 are the surface adjacent to the third plastic lens 224 and the surface adjacent to the fourth plastic lens 242 respectively. The surfaces S11 and S12 of the fourth plastic lens 242 are the surface adjacent to the glass lens 232 and the surface adjacent to the photosensitive device 50 respectively.

TABLE 2

| | | Wide-end Configuration | Middle Configuration | Tele-end Configuration |
|---|---|---|---|---|
| Effective Focal Length (EFL) | | 3.486 | 4.949 | 10.457 |
| Field of View (FOV) | | 80 | 60 | 30 |
| F value(F/#) | | 2.8 | 3.7 | 5.5 |
| Variable Distance (mm) | S2 | 5.585 | 3.886 | 0.487 |
| | S9 | 0.300 | 0.399 | 1.413 |
| | S11 | 0.600 | 2.200 | 4.585 |

Table 2 lists out the values of some of the most important parameters including the effective focal length (EFL), the field of view (FOV), the F-number (F/#) and the variable distance (mm) of the surfaces S2, S9, S11 when the zoom lens 200 is in a wide-end configuration, a middle configuration and a tele-end configuration respectively.

Figure 3A:
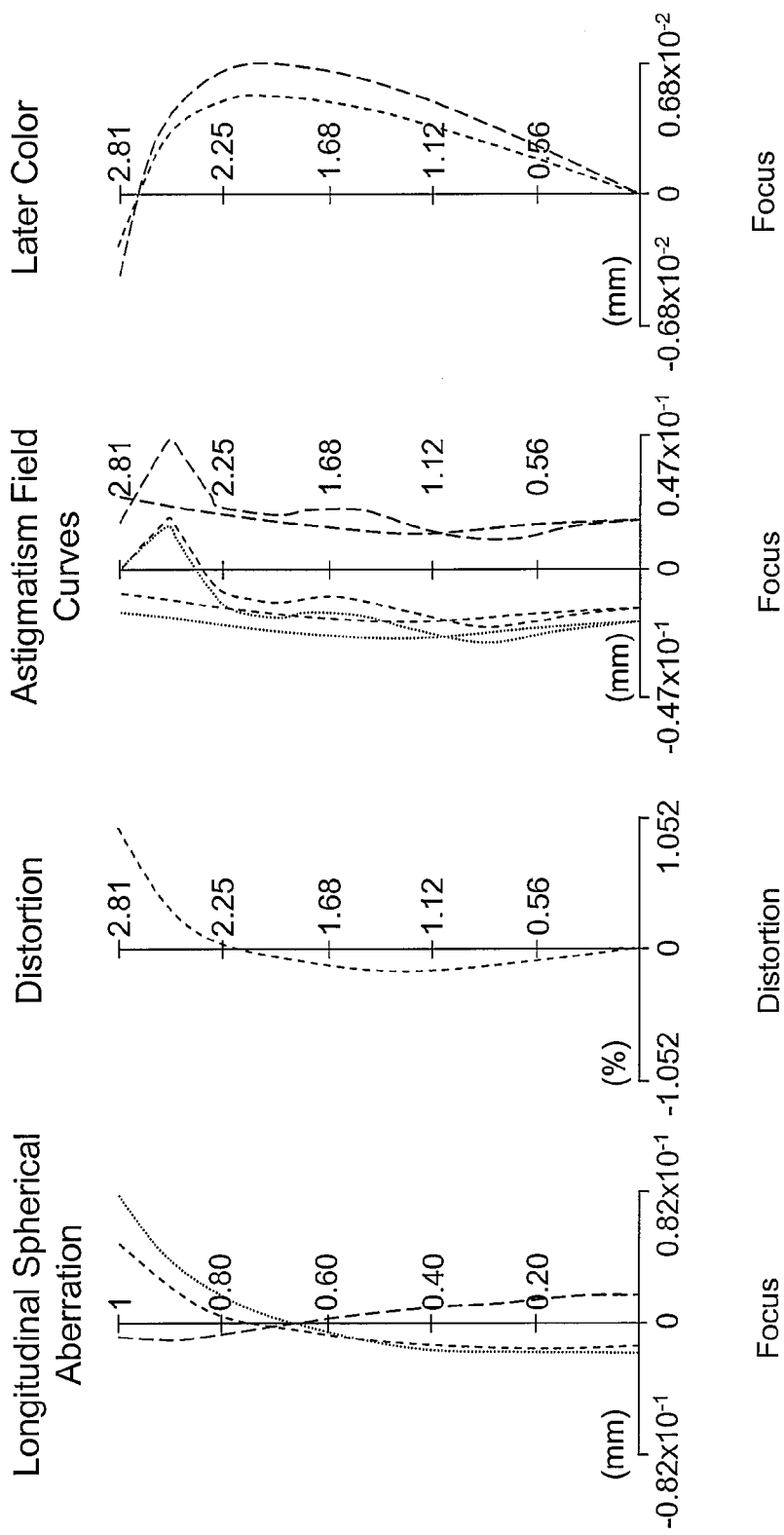
FIG. 3A through 3C are diagrams showing an imaging optical data corresponding to the configurations of the zoom lens in FIGS. 2A through 2C.
Figure 3B:
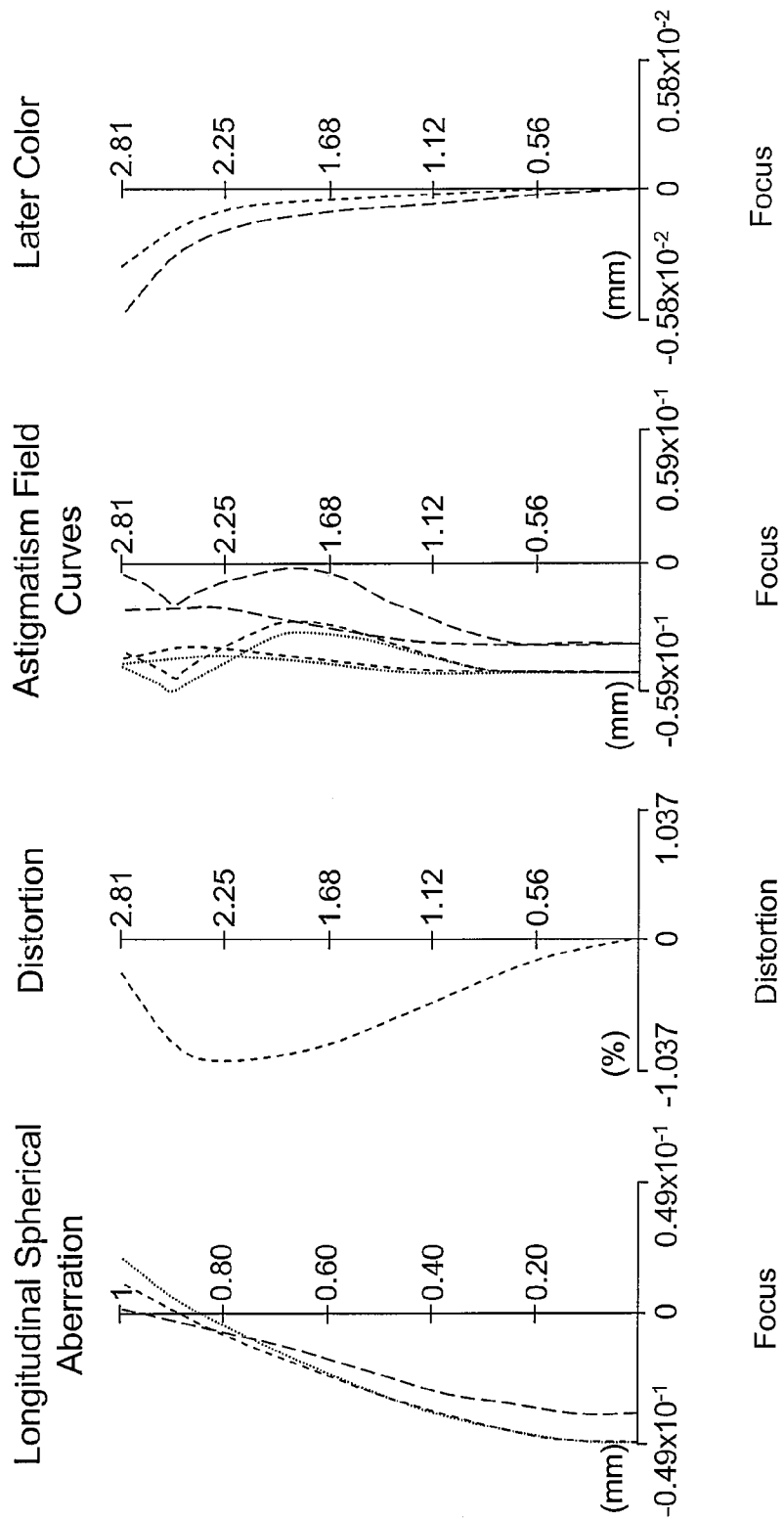
Figure 3C:
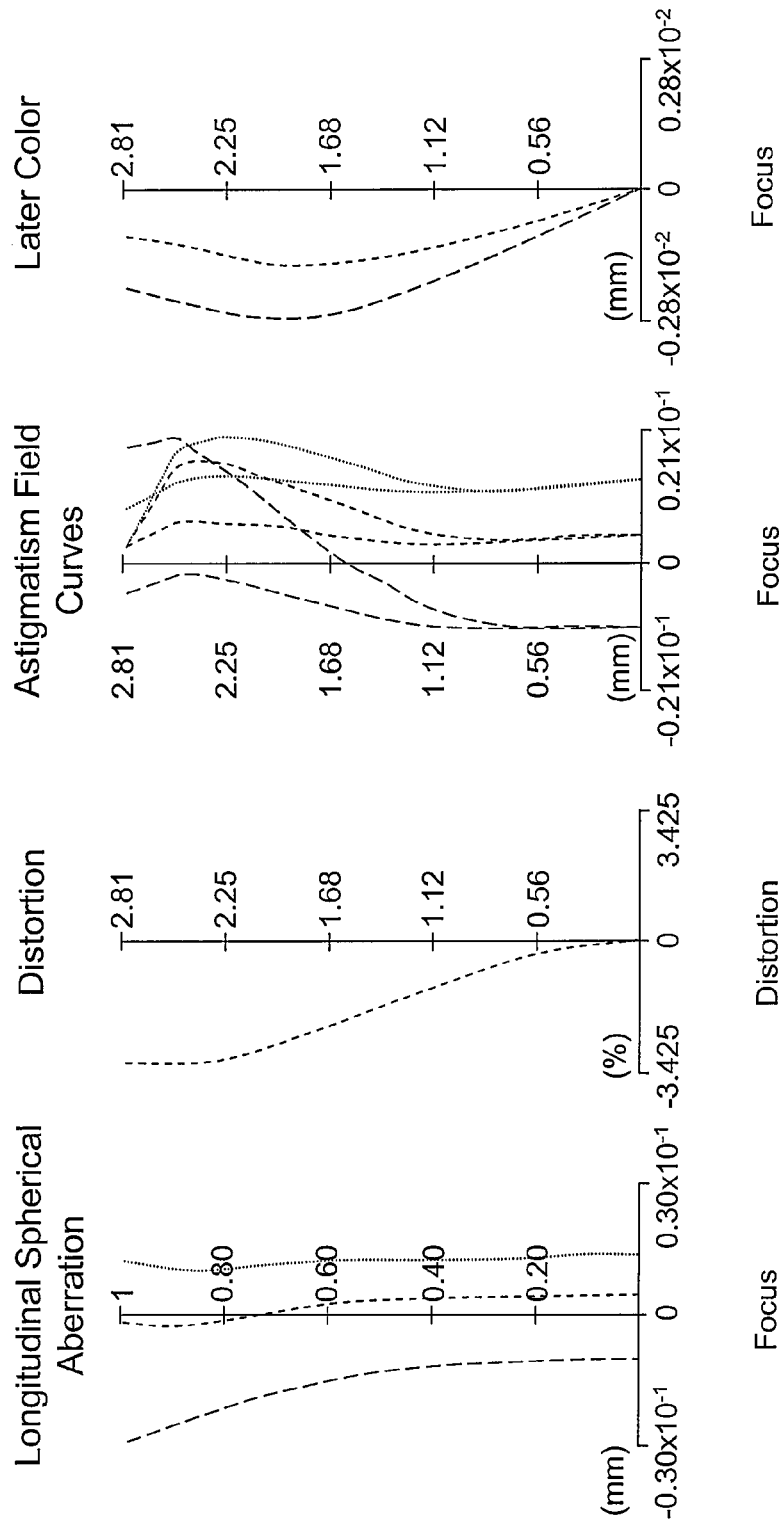

FIG. 3A through 3C are diagrams showing the imaging optical data corresponding to the configurations of the zoom lens in FIGS. 2A through 2C. As shown in FIGS. 3A through 3C, the graphs of longitudinal spherical aberration, distortion, astigmatism field curves and lateral color aberration all lie within the standard range, such that the zoom lens 200 of the prevent invention has good optical properties.

It should be noted that anyone familiar with this technique might execute a few adjustments of the foregoing parameters and transform the zoom lens into an element suitable for a projection system. Any such modifications to the zoom lens are considered to be within the scope of the present invention.

In summary, the zoom lens in the present invention has at least the following advantages:

1. Compared with a conventional 6-lenses or a 10-lenses zoom lens, the zoom lens in the present invention only requires 5 lenses and only one of the five lenses is made of glass which is more expensive. This arrangement reduces the material cost considerably to lower the production cost, and minimizes the accumulation of tolerance. As a result, the optical quality of the zoom lens is improved.

2. The zoom lens is zoomed in or zoomed out by moving the second lens group and the third lens group only. Thus, the linkage mechanism is simpler. A simpler linkage mechanism reduces the cost of producing the linkage mechanism, and minimizes the size of the zoom lens.

3. The third lens group, aside from a focus changing function, also provides image compensation. Therefore, problems such as image aberration and shifting of image surface are avoided.

4. The refractive powers of the four lens groups are respectively negative, positive, negative and positive to eliminate image aberration so that the zoom lens still has a high magnification and resolution despite massive use of plastic lenses.

5. The zoom lens in the present invention is a miniaturized, high resolution, wide field of view zoom lens. Even when the zoom lens is used in different size photosensitive devices, insufficient viewing angle problem never occurs.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A zoom lens, suitable for imaging an object on a photosensitive device, comprising:

a first lens group;

a second lens group, located between the first lens group and the photosensitive device;

a third lens group, located between the second lens group and the photosensitive device; and a fourth lens group, located between the third lens group and the photosensitive device, wherein the second lens group and the third lens group move between the first lens group and the fourth lens group, the first lens group, the second lens group, the third lens group and the fourth lens group comprise at least a glass lens and a plurality of plastic lenses, and the number of plastic lenses is greater than the number of glass lens, a distance between the first lens group and the photosensitive device is D and the field of view angle of the zoom lens is $\theta$, and when the magnification of the zoom lens is switched to a wide-end configuration, $4<\theta/D<5$.

2. The zoom lens of claim 1, wherein the refractive powers of the first lens group, the second lens group, the third lens group and the fourth lens group are negative, positive, negative and positive respectively.

3. The zoom lens of claim 2, wherein the first lens group comprises a first plastic lens having a negative refractive power.

4. The zoom lens of claim 2, wherein the second lens group comprising:

a second plastic lens having a positive refractive power; and a third plastic lens having a positive refractive power and located between the second plastic lens and the third lens group.

5. The zoom lens of claim 4, further comprising an aperture stop disposed between the second plastic lens and the third plastic lens.

6. The zoom lens of claim 2, wherein the third lens group comprises a glass lens and the glass lens has a negative refractive power.

7. The zoom lens of claim 2, wherein the fourth lens group comprises a fourth plastic lens and the fourth plastic lens has a positive refractive power.

8. The zoom lens of claim 7, wherein the fourth plastic lens is a meniscus lens and the convex side of the fourth plastic lens faces the third lens group.

9. The zoom lens of claim 1, wherein, under the various possible magnifications, the difference in an angle of the chief ray of the imaging beam of the object incident upon the photosensitive device is smaller than 15°.

* * * * *